(12) United States Patent
Hanzaike et al.

(10) Patent No.: US 9,250,890 B2
(45) Date of Patent: *Feb. 2, 2016

(54) OPTIMIZING PERFORMANCE OF A COMPUTER SYSTEM IN RESPONSE TO A SOFTWARE CHANGE

(71) Applicant: GLOBALFOUNDRIES INC., Grand Cayman (KY)

(72) Inventors: Manabu Hanzaike, Bunkyo-ku (JP); Yuhichi Ishikawa, Matsudo (JP); Fumihiko Kitayama, Kanagawa-ken (JP); Yoshihiko Kumabayashi, Kiyota-Sapporo (JP); Motoichi Ohya, Kanagawa-pre. (JP); Yuhji Ohyama, Kanagawa (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,587

(22) Filed: Mar. 16, 2015

(65) Prior Publication Data

US 2015/0186130 A1 Jul. 2, 2015

Related U.S. Application Data

(63) Continuation of application No. 13/891,725, filed on May 10, 2013, now Pat. No. 9,069,892.

(51) Int. Cl.
*G06F 11/00* (2006.01)
*G06F 9/445* (2006.01)
(Continued)

(52) U.S. Cl.
CPC ........ *G06F 8/65* (2013.01); *F16D 13/68* (2013.01); *G06F 9/44505* (2013.01); *G06F 11/3604* (2013.01)

(58) Field of Classification Search
USPC ............................................ 714/26, 25
See application file for complete search history.

(56) References Cited

U.S. PATENT DOCUMENTS 8,204,980 B1 * 6/2012 Sandstrom et al. ........... 709/224
2010/0011243 A1 * 1/2010 Locasto et al. ................. 714/15
(Continued)

FOREIGN PATENT DOCUMENTS

JP 6214764 8/1994
JP 6332684 12/1994
(Continued)

OTHER PUBLICATIONS

Notice of Allowance (Feb. 27, 2015) for U.S. Appl. No. 13/891,725, filed May 10, 2013, Conf. No. 6791.

*Primary Examiner* — Sarai Butler
(74) *Attorney, Agent, or Firm* — Thompson Hine LLP

(57) ABSTRACT

A method and associated systems that allow a computer system to optimize its performance when running a computer program after a characteristic of a variable of the computer program is changed. A processor of a computer system initially identifies a first generation of candidate components of the computer program that could possibly be affected by changing the characteristic and then confirms these identifications by analyzing one or more characteristics of the variable and of each identified component. The processor repeats this procedure, identifying in each iteration a next generation of program components that would be affected by varying a characteristic of any of the components confirmed in the current generation. This procedure repeats until the processor can confirm no additional previously unconfirmed components. The processor then considers the identified set of affected components in order to optimize its performance running the program after the variable's characteristic is changed.

19 Claims, 2 Drawing Sheets

(51) Int. Cl.
  *G06F 11/36* (2006.01)
  *F16D 13/68* (2006.01)

(56) References Cited

U.S. PATENT DOCUMENTS

2011/0161740 A1* 6/2011 Sonoda et al. .................. 714/40
2014/0282419 A1   9/2014 Yoshida et al.
2014/0337672 A1   11/2014 Hanzaike et al.

FOREIGN PATENT DOCUMENTS

| | | |
|---|---|---|
| JP | 7078072 | 3/1995 |
| JP | 7319732 | 12/1995 |
| JP | 9128224 | 5/1997 |
| JP | 11203116 | 7/1999 |
| JP | 11272503 | 10/1999 |
| JP | 11327879 | 11/1999 |
| JP | 2000039998 | 2/2000 |
| JP | 2000181700 | 6/2000 |

* cited by examiner

OPTIMIZING PERFORMANCE OF A COMPUTER SYSTEM IN RESPONSE TO A SOFTWARE CHANGE

This application is a continuation application claiming priority to Ser. No. 13/891,725, filed May 10, 2013, now U.S. Pat. No. 9,069,892, issued Jun. 30, 2015.

TECHNICAL FIELD

The present invention relates to analyzing the way that changing one part of a computer program affects other parts of the same program and other computer programs.

BACKGROUND

Even a minor modification to one module of a computer program may cause an unintended consequence in the same program module or in a different computer program or module that is related to or that directly or indirectly communicates with the modified module. The complex nature of much computer software may make it difficult to analyze or predict such effects.

BRIEF SUMMARY

A first embodiment of the present invention provides a method for reducing false-positive errors in a software change-impact analysis of a basepoint variable, the method comprising:

a processor of a computer system receiving an identification of the basepoint variable;

the processor identifying a first generation of candidate change-affected parts, wherein the first generation comprises parts of one or more computer programs, wherein the first generation comprises a first candidate part, and wherein the first candidate part may be affected by a change to the basepoint variable;

the processor confirming that the identification of the first candidate part is unlikely to be a false-positive identification;

the processor adding the first candidate part to a set of confirmed change-affected parts; and the processor selecting a next generation of candidate change-affected parts, wherein the next generation comprises parts of one or more computer programs, wherein the next generation comprises a second candidate part, and wherein the second candidate part may be affected by a change to the first candidate part.

A second embodiment of the present invention provides a computer program product, comprising a computer-readable hardware storage device having a computer-readable program code stored therein, said program code configured to be executed by a processor of a computer system to implement a method for reducing false-positive errors in a software change-impact analysis of a basepoint variable, the method comprising:

the processor receiving an identification of the basepoint variable;

the processor identifying a first generation of candidate change-affected parts, wherein the first generation comprises parts of one or more computer programs, wherein the first generation comprises a first candidate part, and wherein the first candidate part may be affected by a change to the basepoint variable;

the processor confirming that the identification of the first candidate part is unlikely to be a false-positive identification;

the processor adding the first candidate part to a set of confirmed change-affected parts; and the processor selecting a next generation of candidate change-affected parts, wherein the next generation comprises parts of one or more computer programs, wherein the next generation comprises a second candidate part, and wherein the second candidate part may be affected by a change to the first candidate part.

A third embodiment of the present invention provides a computer system comprising a processor, a memory coupled to said processor, and a computer-readable hardware storage device coupled to said processor, said storage device containing program code configured to be run by said processor via the memory to implement a method for reducing false-positive errors in a software change-impact analysis of a basepoint variable, the method comprising:

the processor receiving an identification of the basepoint variable;

the processor identifying a first generation of candidate change-affected parts, wherein the first generation comprises parts of one or more computer programs, wherein the first generation comprises a first candidate part, and wherein the first candidate part may be affected by a change to the basepoint variable;

the processor confirming that the identification of the first candidate part is unlikely to be a false-positive identification; and the processor adding the first candidate part to a set of confirmed change-affected parts;

the processor selecting a next generation of candidate change-affected parts, wherein the next generation comprises parts of one or more computer programs, wherein the next generation comprises a second candidate part, and wherein the second candidate part may be affected by a change to the first candidate part.

DETAILED DESCRIPTION

Figure 1:
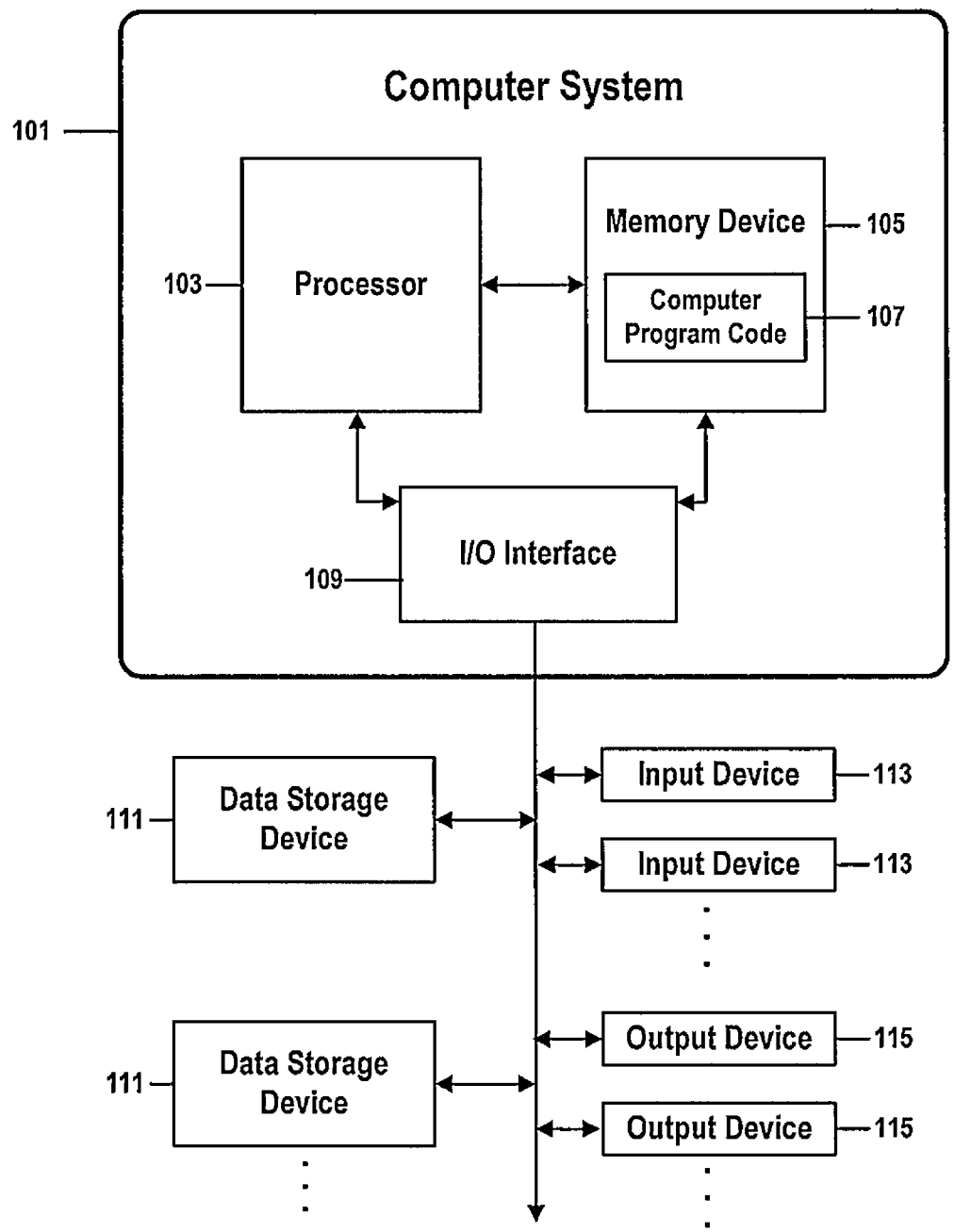
FIG. 1 shows the structure of a computer system and computer program code that may be used to implement a method for the efficient selection of runtime rules for programmable search in accordance with embodiments of the present invention.

Computer programs are often modified, but even a seemingly minor change to one module of a program may affect another part of the changed program module or may affect a different computer program or module that is related to or that directly or indirectly communicates with the changed module.

There are many ways in which such an effect can occur and the complex nature of much computer software may require performing a "change-impact analysis" in order to analyze and predict such effects. Such an analysis may identify a change-impacted part, such as a simple variable, a data structure, a work area, a software program or module, or an other logically distinct element of stored information, that is directly or indirectly affected by a change to a variable of a computer program. Such a directly or indirectly affected part is said to be "change-affected" by the changed variable of the computer program.

Here, a work area may be any storage location or logical entity that is used to store interim values generated during the steps of an operation or function. An integer variable, for example, might be used as a work area to temporarily save values that would otherwise be lost due to rounding errors during an integer-arithmetic operation. In this example, the contents of the work area related to the integer-arithmetic operation would be retained only until the completion of the integer-arithmetic operation. After the completion of the integer-arithmetic operation, the work area would become available to store different, possibly unrelated, values.

Changing a single variable of a computer module may affect an entire generation of change-affected parts. Such an effect upon a change-affected part may further affect an other generation of change-affected parts. Because computer systems and computer programs are often logically linked, networked, shared, or otherwise related, a single change to a first computer-program module may thus directly or indirectly affect many generations of change-affected parts. In some cases, these many generations may include a change-affected part comprised by a computer program that is external to the first changed computer-program module or may include a change-affected part comprised by a program running on a different computer than the computer system that runs the first changed computer-program module.

The complexity and overhead of a change-impact analysis may be increased by a "false-positive" identification that wrongly identifies a logically distinct entity as being a change-affected part. Even one such false-positive identification may spawn many generations of incorrect identifications.

In some cases, a false-positive identification may identify a part that is not affected by a change being analyzed by a change-impact analysis. In some cases, a wrongly identified variable may be affected by a change made to a second variable, but the false-positive identification may incorrectly characterize that affect as being functionally dependent upon changes made to a third variable.

The present invention simplifies and increases the accuracy of a change-impact analysis by detecting and eliminating some or all false-positive identification errors.

This invention may be implemented as a method performed by a processor of a computer system, as a computer program product, as a computer system, or as a processor-performed process or service for supporting computer infrastructure.

A false positive identification may occur when a program stores a series of different data items in a same storage area, processes different data items by means of a same operator or a same function, or otherwise blurs a distinction between characteristics of different variables, data structures, or other types of logical entities. In some cases, the blurring may be temporal, such as when a set of variables, data structures, or other types of data items are functionally or logically related, or are managed in similar ways, in one part of a computer program, but not in an other part of the program. A state of a variable X may, for example, depend upon a value of a variable Y in a first block of program code, but a change to a value of Y may not affect a state of X in a second block.

In another example, a change to a value of an instance of a variable A may affect a value of an instance of a variable B when that change and the instances of A and B all occur in a first module of a computer program. However, variable B may be reused in a second module of the program for a different purpose, where that different purpose is unrelated to the instance of variable A in the first module. In such a case, a change-impact analysis that identifies a change-affect dependency of B upon A in the first module may mistakenly assume that a change to A in the first module would similarly affect a value of the instance of B in the second module. This identification of B as a change-affected part in second module would thus be a false-positive identification.

Furthermore, this false-positive identification of a change-affect dependency in the second module might further spawn additional false-positive identifications. Such a further false-positive identification might occur, for example, if a variable C in the second module is affected by a state of the instance of variable B in the second module, but is not affected by a state of the instance of variable B in the first module.

A false-positive identification may occur in any program that uses a variable or other logical entity as a general work area, for temporary storage, or for a similar multipurpose function. A program might, for example, use an integer variable as temporary storage during floating-point multiplication calculations. In a first program module, only changes to a first set of variables used in a first multiplication calculation might affect the integer variable. But in a second program module, where the integer variable is used only for a second calculation made upon a second set of variables, only changes to that second set of variables might affect the integer variable. A change-impact analysis that identifies the integer variable as being change-affected by changes to the first set of variables in the first section might thus generate a false positive identification by incorrectly identifying the instance of the integer variable in the second module as being change-affected by a change made to the first set of variables.

FIG. 1 shows the structure of a computer system and computer program code that may be used to implement a method for the efficient selection of runtime rules for programmable search in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for the efficient selection of runtime rules for programmable search in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for the efficient selection of runtime rules for programmable search.

Any of the components of the present invention could be created, integrated, hosted, maintained, deployed, managed, serviced, supported, etc. by a service provider who offers to facilitate a method for the efficient selection of runtime rules for programmable search. Thus the present invention discloses a process for deploying or integrating computing infrastructure, comprising integrating computer-readable code into the computer system 101, wherein the code in combination with the computer system 101 is capable of performing a method for the efficient selection of runtime rules for programmable search.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
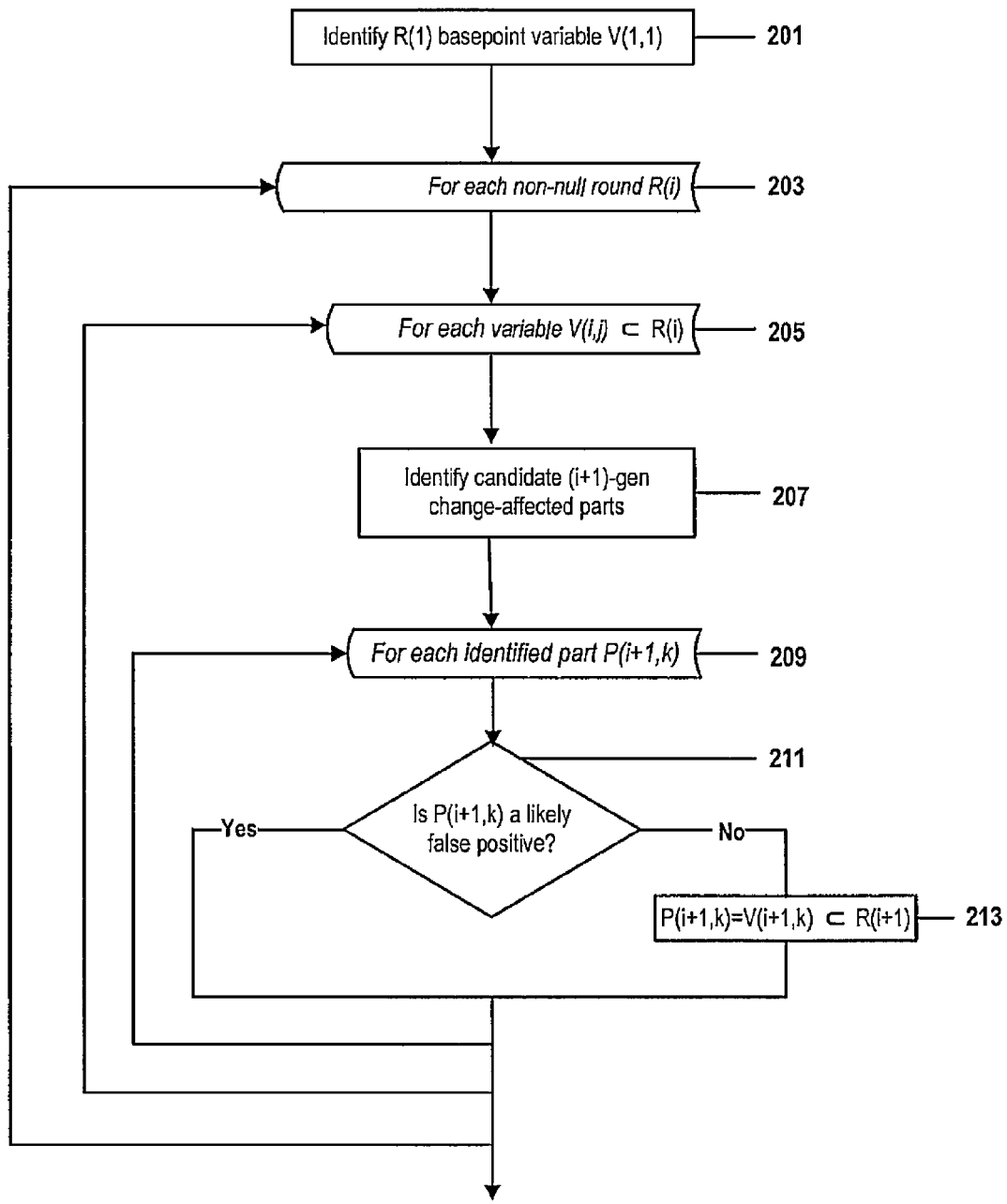
FIG. 2 is a flow chart that overviews a method of reducing false-positive errors in a software change-impact analysis in conformance with embodiments of the present invention.

FIG. 2 is a flow chart that overviews a method of reducing false-positive errors in a software change-impact analysis in conformance with embodiments of the present invention. FIG. 2 comprises steps 201-213.

FIG. 2 shows embodiments of the present invention that comprise a change-impact analysis, wherein the change-impact analysis comprises i generations of computational or analytical "rounds."

An $i^{th}$-generation round R(i) identifies a plurality of sets of $(i+1)^{st}$-generation change-affected parts that are change-affected by a set of $i^{th}$-generation variables.

An $i^{th}$-generation round R(i) further associates a first $i^{th}$-generation variable of the set of $i^{th}$-generation variables with a first set of $(i+1)^{st}$-generation change-affected parts of the plurality of sets of $(i+1)^{st}$-generation change-affected parts, wherein a change to a value or other characteristic of the first $i^{th}$-generation variable affects a value or other characteristic of a first change-affected part of the first set of $(i+1)^{st}$-generation change-affected parts.

In this document, we will refer to a variable of the set of $i^{th}$-generation variables as being "comprised by" the round R(i), or as being "of" the round R(i). The term "variable" may refer to a simple variable, to a data structure, to a storage area or memory location, to a software program or module, or to an other logically distinct element of stored information. Here, the term "affected part" may refer to a simple variable, to a data structure, to a storage area or memory location, to a software program or module, or to an other logically distinct element of stored information that is directly or indirectly affected by a change to an other variable.

A same entity may be treated as a variable in a first round and treated as a change-affected part in a second round, wherein the first round and the second round may be distinct or may be a same round. An $(i+1)^{st}$-generation change-affected part identified during a first round R(i), for example, may be treated as an $(i+1)^{st}$-generation variable analyzed during the next round R(i+1).

The embodiment of FIG. 2 comprises three nested iterative procedures, wherein an $i^{th}$ iteration of the outermost nested iterative procedure of steps 203-213 represents an $i^{th}$ round R(i) that identifies an $(i+1)^{st}$-generation of m change-affected parts $\{P(i+1,m)\}$, where m≥0 and where a $j^{th}$ identified part P(i+1,j) of the set $\{P(i+1,m)\}$ is change-affected by at least one $i^{th}$-generation variable analyzed by round R(i). The method of FIG. 2 ends when a round R(i) identifies no $(i+1)^{st}$-generation change-affected parts (m=0).

An $i^{th}$ round R(i) may identify the $j^{th}$ change-affected part P(i+1,j) of the set of $(i+1)^{st}$ generation change-affected parts $\{P(i+1,m)\}$ as being dependent upon a $k^{th}$ variable V(i,k) of a set of n $i^{th}$-generation variables $\{V(i,n)\}$, such that a change to a first value or first other characteristic of analyzed variable V(i,k) may affect a second value or second other characteristic of change-affected part P(i+1, j). This document describes such a relationship by stating that P(i+1,j) is "change-affected" by variable V(i,k), or that P(i+1,j) is a "change-affected part" of variable V(i,k).

Step 201 initializes the method of FIG. 2 to perform a first round R(1). The initialization comprises identifying a "basepoint" $1^{st}$-generation variable V(1,1) that will be analyzed by the first round R(1), wherein the round R(1) comprises a first iteration of the iterative process of steps 203-213. This basepoint variable V(1,1) will identify a variable, data structure, storage area or memory location, software program or module, or other logically distinct element of stored information that is an initial subject of a change-impact analysis, wherein an intent of the change-impact analysis is to determine how changing a value or other characteristic of V(1,1) may affect other variables, data structures, storage areas or memory locations, software programs or modules, or other logically distinct elements of stored information.

Terminology consistent with that of exemplary embodiments of FIG. 2 identifies V(1,1) as a first variable of round R(1). In embodiments described below, the initial round R(1) comprises only one variable, so the round R(1) comprises no V(1,2). In other embodiments of the method of FIG. 2, however, a first round R(1) may be initialized by step 201 to comprise more than one $1^{st}$-generation variable.

Step 203 initiates an iterative procedure of steps 203-213, wherein each iteration of the iterative procedure of steps 203-213 represents one non-null round R(i) of computation or analysis. As described here, a non-null round R(i) is a round that comprises a set of m>0 $i^{th}$-generation variables $\{V(i,j), j=1 \ldots m\}$.

The first iteration of the iterative procedure of steps 203-213 performs computations or analyses of a round R(1), where the round R(1) analyzes the basepoint $1^{st}$-generation variable V(1,1) identified in step 201 in order to identify a set of r $2^{nd}$-generation change-affected parts $\{P(2,j), j=1 \ldots r\}$, wherein a change made to a first value or a first other characteristic of V(1,1) affects a second value or a second other characteristic of a part P(2,j) of the set of $2^{nd}$-generation change-affected parts.

Step 205 initiates a nested iterative procedure of steps 205-213, wherein the nested iterative procedure of steps 205-213 is nested within the outermost iterative procedure of steps 203-213. Each iteration of the nested procedure of steps 205-213 that runs within an iteration of the outer identifies a set of $(i+1)^{st}$-generation of m change-affected parts that are change-affected by a $j^{th}$ variable V(i,j) of the set of $i^{th}$-generation variables identified in the round R(i−1) (i>1) performed by a previous iteration of the iterative procedure of steps 203-213. Thus, the nested iterative procedure of steps 205-213 performs j iterations for each round R(i), wherein R(i) comprises j variables V(i,j).

In the special case of the first round R(1), because R(i−1)=R(0) does not exist, the nested iterative procedure of steps 205-213 runs only once by default and analyzes only the basepoint variable V(1,1) identified in step 201. The first iteration of the nested iterative procedure of steps 205-213 identifies a set of n $2^{nd}$-generation change-affected parts $\{P(2,j), j=1 \ldots n\}$, wherein the n $2^{nd}$-generation change-affected parts are each change-affected by changes to a value or other characteristic of the basepoint $1^{st}$-generation variable V(1,1) identified by step 201. Because R(1) comprises only one variable, the method of FIG. 2 thus performs only one iteration of the nested iterative procedure of steps 205-213 when i=1 in step 203.

At the completion of j iterations of the nested iterative procedure of steps 205-213, the method of FIG. 2 will have identified j sets of $(i+1)^{st}$-generation change-affected parts, wherein a first set of the j sets identifies a first set of parts that may be change-affected by a first variable of the set of j variables comprised by round R(i).

A change-affected part identified by an iteration of the nested iterative procedure of steps 205-213 will be analyzed in the $(i+1)^{st}$ iteration of the outermost iterative procedure of steps 203-213, wherein the change-affected part P(i+1,x) identified by the iterative procedure of steps 203-213 will be analyzed as an $(i+1^{st})$-generation variable V(i+1,y) of round R(i+1).

In other words, a change-affected part identified by round R(i) will become a variable comprised by round R(i+1), and round R(i+1) will determine whether that variable change-affects an $(i+2)^{nd}$-generation part.

Step 207 identifies a set of candidate $(i+1)^{st}$-generation change-affected parts that are change-affected by variable V(i,j). These parts may be located in the same computer program that comprises variable V(i,j), in the same computer-program module that comprises variable V(i,j), or in an external computer program or other external software component that does not comprise V(i,j).

The identification of step 207 may be performed through any method known to those skilled in the art of computer science, software design, analytics, software engineering, or test engineering.

In an example, variable V(i,j) might be represented in a source module by object Index[1]. Step 207 might then attempt to identify candidate parts that may be change-affected by variable V(i,j), by using a combination of methods that include, but are not limited to:

searching the source module for assignment statements that assign a value of Index[1] to a candidate change-affected variable;

identifying an external computer program or an external computer module that receives a value or address of Index[1] from the source module, and then searching the external computer program or the external computer module for assignment statements that assign a candidate change-affected variable a value of Index[1]; or searching the source module, and the external computer program or the external computer module for statements that assign a candidate change-affected variable a value that is a function of a value, address, or characteristic of Index[1].

Many other identification methods, techniques, and models known to those skilled in the relevant arts are possible, and steps of these methods may be combined or performed in any order that meets a goal of the change-impact analysis of an embodiment of the present invention.

In some embodiments, step 207 may be incorporated into or combined with another step of FIG. 2, or may be performed all or in part in a different sequence relative to other steps of FIG. 2.

At the conclusion of step 207, the method of FIG. 2 will have identified a set of q candidate $(i+1)^{st}$-generation change-affected parts {P(i+1,k), k=0 ... q}, wherein each candidate part comprised by {P(i+1,k)} may be change-affected by $i^{th}$-generation variable V(i,j).

In some embodiments, if two iterations of step 207 identify a same part, the second identification may be ignored in order to avoid redundancy.

Step 209 initiates a second-level nested iterative procedure of steps 209-213 that is nested within the nested iterative procedure of steps 205-213.

An iteration of the second-level nested iterative procedure of steps 209-213 will be performed once for each of the q≥0 candidate change-affected part identified in step 207. In some embodiments, if step 207 identifies q candidate parts, the procedure of steps 209-213 may be performed q times. In other embodiments, if step 207 identifies q candidate parts, r of which are duplicates and (q-r) of which are distinct, the procedure of steps 209-213 may be performed (q-r) times in order to avoid redundancy. In other embodiments, the procedure of steps 209-213 may be performed fewer than q times for reasons that may include, but are not limited to, a failure of certain of the candidate parts identified in step 207 to satisfy a threshold condition.

Step 211 determines whether the identification of part P(i+1,k), identified in step 207 as an $(i+1)^{st}$-generation candidate change-affected part is likely to be a false-positive identification. This determination may be determined as a function of a characteristic of $i^{th}$-generation variable V(i,j) or as a function of a characteristic of $(i+1)^{st}$-generation candidate change-affected part P(i+1,k).

In one example, a first module of a computer program may comprise a storage location that is associated with a variable V(i,j) in a first module of the program and that is associated with a different, unrelated variable in a second module of the program. If a first candidate part is affected by changing a value stored in the storage location in the first module, step 211 may thus identify the first candidate part as being change-affected by V(i,j) in the first module. But even if a change to the storage location in the second module change-affects a second candidate part in the second module, identifying that second candidate part as being change-affected by V(i,j) would be a false-positive identification if the storage location is not associated with V(i,j) in the second module.

When the method of FIG. 2 performs a change-impact analysis upon the computer program of this example, it is thus possible that step 207 identifies a first candidate change-affected part P(i+1, x) in the first module and a second candidate change-affected part P(i+1, y) in the second module. A first iteration of step 211 might then determine whether a change to the storage location in the first module is likely to change-affect the first candidate part P(i+1, x) in the first module. A second iteration of step 211 might further determine whether a change to the storage location in the first module is likely to change-affect the second candidate part P(i+1, y) in the second module. Depending on details of the computer program, the two determinations in similar examples may produce any combination of results, determining that neither part, either part, or both parts are likely to be change-affected.

False-positive identifications may occur for other reasons that may depend on characteristics of the methods, techniques, or models used to identify candidate parts in step 207 and step 211 may use other techniques to determine that an identification of a candidate change-affected part is likely the result of a false-positive error.

Step 211 may, for example, determine that a variable V(i,j) being analyzed by a round R(i) is declared or defined to have a specific length or data type. If a computer program that comprises V(i,j) changes the length or storage size of variable V(i,j) or changes the data type of variable V(i,j), step 211 may determine that the resulting variable, despite a similar or identical logical identifier or memory address, is no longer equivalent to the variable V(i,j) being analyzed. An identification of a candidate change-affected part in step 207, where that part is affected by a change to V(i,j) only after the change to V(i,j)'s length or data type, may thus be determined by step 211 to be a false-positive identification.

Such changes to a variable may be made in a variety of ways and the mechanism used may be a function of a syntax of a computer language. Some languages, for example, may offer features like indirect addressing or a command that instructs a computer to interpret data stored in one data format as though it had been stored in a different format, and these features may be used to store different, independent variables in a same storage location at different times, where the different, independent variables may have different lengths or data types. In other languages, the data type of a variable or other data element may be changed implicitly when the variable or data element is passed between program modules as an argument or parameter, or when the variable or data element is used as an argument to a function.

In such cases, a variable being analyzed may be converted into a logically distinct entity after such a conversion or change and even candidate change-affected parts that are truly change-affected by the variable after the change may not be considered to be change-affected by the variable being analyzed.

In some embodiments, step 211 may further determine that a first variable under analysis has been converted into an independent, unrelated second variable by comparing a declared characteristic of the first variable, such as a data type or length, to characteristics of other logical entities that are equated to or related to the variable. Consider, for example, a change-impact analysis that analyzes variable V(i,j) in a first module, where V(i,j) is declared to be an extended-precision integer variable and is a subject of extended-precision integer arithmetic. If a second module performs a series of string operations on V(i,j), step 211 may determine that, if a candidate part is affected by a change to V(i,j) in the second module, identifying that part to be change-affected by the original analyzed V(i,j) variable is likely to be a false-positive identification.

If step 211 determines that part P(i+1,k) is not likely to be change-affected by a change to variable V(i,j) and further determines that the identification of P(i+1,k) in step 207 as a candidate $(i+1)^{st}$-generation change-affected part is thus likely a false-positive identification, then step 213 is not performed and the current iteration of the procedure of steps 209-213 ends. The next iteration of the iterative procedure of steps 209-213 continues with an analysis of a candidate part P(i+1,k+1) identified in step 209.

If step 211 determines that part P(i+1,k) is likely to be change-affected by changes to variable V(i,j) and that the identification of P(i+1,k) in step 207 as a candidate $(i+1)^{st}$-generation change-affected part is not likely to be a false-positive identification, then step 213 is performed.

Step 213 is performed if step 211 determines that the identification of P(i+1,k) in step 207 as a candidate $(i+1)^{st}$-generation change-affected part is not likely to be a false-positive identification.

If performed, step 213 adds change-affected part P(i+1,k) to the $(i+1)^{st}$-generation round R(i+1). The next iteration of the iterative procedure of steps 203-213 will treat this part P(i+1,k) as an $(i+1)^{st}$-generation variable V(i+1,k) and will, as part of round R(i+1), attempt to identify $(i+2)^{nd}$-generation change-affected parts that are change-affected by the variable V(i+1,k).

At the conclusion of step 213 (or at the conclusion of step 211 if step 211 determines that the identification of P(i+1,k) in step 207 is a likely false positive identification), a next iteration of the second-level nested iterative procedure of steps 209-213 begins.

If iterations of the second-level nested iterative procedure of steps 209-213 have evaluated all k candidate parts identified in step 209, then the current set of iterations of the second-level nested iterative procedure of steps 209-203 ends and the next iteration of the nested iterative procedure of steps 205-213 begins, using the next value of j and the next $i^{th}$-generation variable V(i,j).

If the nested iterative procedure of steps 205-213 have analyzed all $i^{th}$-generation variables V(i,j), then the current set of iterations of the nested iterative procedure of steps 205-213 terminates and the next iteration of the procedure of steps 203-213 begins, using the next value of i and the next round R(i).

If, at the conclusion of all iterations of the iterative procedure of steps 203-213 for round R(i), the iterative procedure of steps 203-213 has identified no likely change-affected parts for round R(i) and no variables for round R(i+1) (that is, if k=0 for all variables V(i,j)), then the iterative procedure of steps 203-213 terminates and the method of FIG. 2 terminates.

Upon the termination of the method of FIG. 2, embodiments of the present invention will have identified a set of likely change-affected parts for each round R(i) performed by the method of FIG. 2. Embodiments of the present invention may further process these sets by combining them into a single set of all parts change-affected by a change to base-point variable V(1,1); by characterizing, organizing, or sorting the parts comprised by the sets or subsets of the parts comprised by the sets; by eliminating redundant or equivalent parts comprised by the sets; or in other ways, using methods known to those skilled in the relevant arts and in ways that conform to the intent, application, or further use of a change-impact analysis performed by the method of FIG. 2.

What is claimed is:

1. A method for optimizing a performance of a computer system running a computer program after the program has undergone a change, the method comprising:
   the computer system selecting, from a set of components of the computer program, a set of first-generation candidate components that have a likelihood of being affected by a varying of a characteristic of a variable comprised by the computer program;
   the computer system confirming that each component of a subset of the set of first-generation candidate components would actually be affected by the varying; and
   the computer system further selecting from the set of components of the computer program a set of next-generation candidate components, wherein a second-generation component of the set of next-generation candidate components is identified as having a likelihood of being affected by a change to any first-generation component of the subset of the set of first-generation candidate components.

2. The method of claim 1, wherein a confirming of a first component of the subset is performed as a function of an attribute of the variable and as a further function of a characteristic of the first component.

3. The method of claim 2, wherein the characteristic of the variable and the attribute of the variable are selected from a group comprising: the variable's data length, data type, and storage location, and wherein the characteristic of the first component is selected from a group comprising: the first component's data length, data type, and storage location.

4. The method of claim 1, further comprising the computer system deleting duplicate components from the subset of the set of first-generation candidate components.

5. The method of claim 1, further comprising:
the computer system repeating the confirming and the further selecting, substituting each component of the subset for the variable, and substituting the set of next-generation candidate components for the set of first-generation candidate components;
the computer system halting the repeating when an iteration of the confirming and further selecting does not result in a further selection of a previously unselected next-generation component; and
the computer system optimizing a performance of the computer program running on the computer system by characterizing, organizing, or sorting all components confirmed during the repeating.

6. The method of claim 1, wherein the variable, each component of the subset, and each component of the set of next-generation candidate components are selected from a group comprising: a variable, a data structure, a software program or module of a software program, and a storage location.

7. The method of claim 1, further comprising providing at least one support service for at least one of creating, integrating, hosting, maintaining, and deploying computer-readable program code in the computer system, wherein the computer-readable program code in combination with the computer system is configured to implement the selecting, confirming, and further selecting.

8. A computer program product, comprising a computer-readable hardware storage device having a computer-readable program code stored therein, said program code configured to be executed by a processor of a computer system to implement a method for optimizing a performance of a computer system running a computer program after the program has undergone a change, the method comprising:
the computer system selecting, from a set of components of the computer program, a set of first-generation candidate components that have a likelihood of being affected by a varying of a characteristic of a variable comprised by the computer program;
the computer system confirming that each component of a subset of the set of first-generation candidate components would actually be affected by the varying; and
the computer system further selecting from the set of components of the computer program a set of next-generation candidate components, wherein a second-generation component of the set of next-generation candidate components is identified as having a likelihood of being affected by a change to any first-generation component of the subset of the set of first-generation candidate components.

9. The computer program product of claim 8, wherein a confirming of a first component of the subset is performed as a function of an attribute of the variable and as a further function of a characteristic of the first component.

10. The computer program product of claim 9, wherein the characteristic of the variable and the attribute of the variable are selected from a group comprising: the variable's data length, data type, and storage location, and wherein the characteristic of the first component is selected from a group comprising: the first component's data length, data type, and storage location.

11. The computer program product of claim 8, further comprising the computer system deleting duplicate components from the subset of the set of first-generation candidate components.

12. The computer program product of claim 8, further comprising:
the computer system repeating the confirming and the further selecting, substituting each component of the subset for the variable, and substituting the set of next-generation candidate components for the set of first-generation candidate components;
the computer system halting the repeating when an iteration of the confirming and further selecting does not result in a further selection of a previously unselected next-generation component; and
the computer system optimizing a performance of the computer program running on the computer system by characterizing, organizing, or sorting all components confirmed during the repeating.

13. The computer program product of claim 8, wherein the variable, each component of the subset, and each component of the set of next-generation candidate components are selected from a group comprising: a variable, a data structure, a software program or module of a software program, and a storage location.

14. A computer system comprising a processor, a memory coupled to said processor, and a computer-readable hardware storage device coupled to said processor, said storage device containing program code configured to be run by said processor via the memory to implement a method for reducing false-positive errors in a software change-impact analysis of a basepoint variable, the method comprising:
the computer system selecting, from a set of components of the computer program, a set of first-generation candidate components that have a likelihood of being affected by a varying of a characteristic of a variable comprised by the computer program;
the computer system confirming that each component of a subset of the set of first-generation candidate components would actually be affected by the varying; and
the computer system further selecting from the set of components of the computer program a set of next-generation candidate components, wherein a second-generation component of the set of next-generation candidate components is identified as having a likelihood of being affected by a change to any first-generation component of the subset of the set of first-generation candidate components.

15. The computer system of claim 14, wherein a confirming of a first component of the subset is performed as a function of an attribute of the variable and as a further function of a characteristic of the first component.

16. The computer system of claim 15, wherein the characteristic of the variable and the attribute of the variable are selected from a group comprising: the variable's data length, data type, and storage location, and wherein the characteristic of the first component is selected from a group comprising: the first component's data length, data type, and storage location.

17. The computer system of claim 14, further comprising the computer system deleting duplicate components from the subset of the set of first-generation candidate components.

18. The computer system of claim 14, further comprising:
the computer system repeating the confirming and the further selecting, substituting each component of the subset for the variable, and substituting the set of next-generation candidate components for the set of first-generation candidate components;

the computer system halting the repeating when an iteration of the confirming and further selecting does not result in a further selection of a previously unselected next-generation component; and the computer system optimizing a performance of the computer program running on the computer system by characterizing, organizing, or sorting all components confirmed during the repeating.

19. The computer system of claim 14, wherein the variable, each component of the subset, and each component of the set of next-generation candidate components are selected from a group comprising: a variable, a data structure, a software program or module of a software program, and a storage location.

* * * * *